United States Patent
DeVito et al.

(10) Patent No.: US 7,343,210 B2
(45) Date of Patent: Mar. 11, 2008

(54) INTERACTIVE DIGITAL MEDIUM AND SYSTEM

(76) Inventors: James DeVito, 4 Sunset Dr., Chappaqua, NY (US) 10514; Marissa Lee DeVito, 1-3 Minetta St., New York City, NY (US) 10012

( * ) Notice: Subject to any disclaimer, the term of this patent is extended or adjusted under 35 U.S.C. 154(b) by 0 days.

(21) Appl. No.: 10/883,884

(22) Filed: Jul. 2, 2004

(65) Prior Publication Data

US 2005/0036628 A1 Feb. 17, 2005

Related U.S. Application Data

(60) Provisional application No. 60/519,502, filed on Nov. 12, 2003, provisional application No. 60/491,924, filed on Aug. 1, 2003, provisional application No. 60/485,092, filed on Jul. 2, 2003.

(51) Int. Cl.
| | |
|---|---|
| *G06F 17/00* | (2006.01) |
| *H04B 1/00* | (2006.01) |
| *H04B 1/20* | (2006.01) |
| *G11B 7/20* | (2006.01) |
| *G11B 3/74* | (2006.01) |

(52) U.S. Cl. ........................... 700/94; 381/119; 369/4; 369/119

(58) Field of Classification Search ................ 381/119, 381/27, 61, 80, 81, 18; 369/94, 4; 700/94; 715/716; 704/270.1; 434/308; 711/111
See application file for complete search history.

(56) References Cited

U.S. PATENT DOCUMENTS

| | | | |
|---|---|---|---|
| 5,212,733 A * | 5/1993 | DeVitt et al. ............... | 381/119 |
| 5,469,370 A * | 11/1995 | Ostrover et al. ............ | 711/111 |
| 5,648,948 A | 7/1997 | Itoh et al. | |
| 5,684,786 A | 11/1997 | Schylander et al. | |
| 5,820,384 A * | 10/1998 | Tubman et al. ............. | 434/308 |
| 5,828,648 A | 10/1998 | Takasu et al. | |
| 5,852,800 A * | 12/1998 | Modeste et al. ......... | 704/270.1 |
| 5,859,826 A | 1/1999 | Ueno et al. | |
| 6,241,843 B1 | 6/2001 | Kaneko et al. | |

(Continued)

FOREIGN PATENT DOCUMENTS

EP 0 558 852 A2 9/1993

(Continued)

OTHER PUBLICATIONS

Architecture of Windows Media Rights Manager, Technical Article [online]. Microsoft Corporation, May 2004 [retrieved on Apr. 12, 2005]. Retrieved from the Internet: <URL: www.microsoft.com/windows/windowsmedia/howto/articles/drmarchitecture.aspx>.*

*Primary Examiner*—Sinh Tran
*Assistant Examiner*—Andrew Flanders
(74) *Attorney, Agent, or Firm*—Ostrolenk, Faber, Gerb & Soffen, LLP

(57) ABSTRACT

The present invention relates to manipulating audio and/or video recordings, particularly music recordings, by giving a user access to individual master tracks and/or channels that make up the recording, that he or she previously did not have access to. The master tracks and/or channels can be manipulated in a variety of ways, such as by adjusting the volume levels and adding special effects.

28 Claims, 7 Drawing Sheets

U.S. PATENT DOCUMENTS

| | | |
|---|---|---|
| 6,404,893 B2 * | 6/2002 | Iori .............................. 381/119 |
| 6,459,797 B1 * | 10/2002 | Ashour et al. ................. 381/18 |
| 6,522,620 B1 | 2/2003 | McPherson et al. |
| 2001/0046199 A1 | 11/2001 | McPherson et al. |
| 2002/0114252 A1 | 8/2002 | Verbakel et al. |
| 2002/0146147 A1 | 10/2002 | Levy |
| 2002/0146148 A1 | 10/2002 | Levy |
| 2003/0053656 A1 | 3/2003 | Levy |
| 2003/0123351 A1 | 7/2003 | Sawabe et al. |
| 2003/0212466 A1 * | 11/2003 | Alferness ..................... 700/94 |
| 2005/0025320 A1 * | 2/2005 | Barry ......................... 381/119 |

FOREIGN PATENT DOCUMENTS

| | | |
|---|---|---|
| EP | 691635 A1 * | 1/1996 |
| JP | 05-250811 | 9/1993 |
| WO | WO 00/42770 | 7/2000 |

* cited by examiner

INTERACTIVE DIGITAL MEDIUM AND SYSTEM

CROSS-REFERENCE TO RELATED APPLICATIONS

The present invention is based on and claims priority to U.S. Provisional Patent Application Ser. No. 60/485,092, filed Jul. 2, 2003, entitled "INTERACTIVE COMPACT DISC," U.S. Provisional Patent Application Ser. No. 60/491,924, filed Aug. 1, 2003, entitled INTERACTIVE COMPACT DISC AND ASSOCIATED APPLICATIONS," and to U.S. Provisional Patent Application Ser. No. 60/519,502, filed Nov. 12, 2003, entitled INTERACTIVE COMPACT DISC AND ASSOCIATED APPLICATIONS," the entire contents of all of which are incorporated by reference.

BACKGROUND OF THE INVENTION

1. Field of the Invention

The present invention relates generally to audio recording distribution, and, more particularly, to providing custom audio mix operations in multi-channel audio recordings.

2. Description of the Related Art

Prior art audio recordings, and, more particularly music recordings, are commercially distributed in a predefined and substantially unalterable stereophonic ("stereo") format. Typically, original "master" audio tracks (e.g., a vocal track, a lead guitar track, a bass guitar track and a drum track) that were recorded in a music studio and, thereafter, mixed by an audio engineer are fixed in a compact disc ("CD"), audio cassette, vinyl disc (LP record), and more recently, DVD, DVD-audio, SACD or other media format for commercial distribution, collectively "playable media".

As used herein, a "master track" refers, generally, to one or more of a single recording instance. For example, a singer who is recording a song may sing the song once, referred to generally as a "take," into a microphone and the take is recorded. The singer then sings the song again, thereby recording a second take. After several takes are recorded, a single take is isolated, or a plurality of takes is combined, and a master track is created therefrom. Typically, a master track is recorded so that playback of the track occurs on at least one audio channel, e.g., a left or a right channel in a stereophonic recording. This process is commonly referred to in the art as "panning".

An audio channel (or, simply, "channel") refers, generally, to a mechanism providing a single path in a multi-path system for simultaneously and separately recording or transmitting sounds from the one source (see, for example, Webster's Third International Dictionary). A master track is, typically, mixed with other master tracks and plays on at least one single channel (e.g., the left stereo channel). A single channel may, in some instances, play only a single master track. More typically, a single channel plays a plurality of master tracks representing one or more voices, one or more instruments or combinations thereof, that are combined or blended (referred to herein, generally, as "mixed") together. In other cases, a single master track, such as a lead vocal track, is formatted to play over two channels.

In a prior art stereo audio recording, master audio tracks are mixed to play over two channels, i.e., the left channel and right channel. Thus, in a stereo system, each channel is made up of one or more master tracks. The master tracks cannot be re-mixed by a purchaser of the playable media, i.e., the compact disc, cassette, vinyl LP or the like. Although the individual master tracks and individual takes are usually saved, for example, in a recording studio's archives, they are not made available to the general public for re-mixing.

Home multi-track recording has been available for a considerable amount of time. Multi-track recorders have included equipment for recording multiple audio tracks on reel-to-reel tape, cassette tape, and digital media, including hard disks, compact discs and recordable DVDs, for example.

Relatively recently, multi-track digital recording software applications have been developed, and are now commercially available at affordable prices. For example CAKE-WALK, BAND-IN-A-BOX, N-TRACK STUDIO, POWERTRACKS PRO AUDIO, PRO-TOOLS or the like available from the known suppliers have enabled people to make multi-track digital recordings using personal computer technology.

Home multi-track recording, especially in a digital form, is a cost-effective and useful way for musicians to record and distribute their music without the overhead of a professional quality recording studio. Typically, musicians who wish to distribute their music use multi-track recording systems to record master audio tracks. The musicians may function as audio engineers, or, alternatively, hire audio engineers to mix the master tracks in order to create a finished, stereo recording of their music. Thereafter, the stereo recording is transferred (referred to in the art as "burned") to a compact disc or other playable media for eventual distribution.

FIG. 1 shows an example prior art playable media commonly referred to as an audio CD that has a stereo recording having left and right channels. As shown in FIG. 1, master tracks 1, 2 and 3, for example, having lead guitar, vocals and drums, are mixed to play on the left stereo channel, and master tracks 4, 5 and 6, for example, having rhythm guitar, vocals and keyboard, are mixed to play on the right stereo channel.

Typically, master audio tracks that are recorded in a native digital multi-track recording application (e.g., "CAKE-WALK") are formatted in one or more digital audio files, for example, formatted as AIFF, WAV, PCM, and/or RIFF files, which are usually uncompressed and, typically, large in size. A multi-track audio recording having, for example, sixteen master tracks typically includes sixteen separate audio files (e.g., WAV files), wherein one file contains a single track. Furthermore, digital multi-track recording software applications use one or more additional files, sometimes referred to as project files, which include information regarding combining the master tracks according to a predetermined mix, and then for manipulating the levels of each respective track, for example, to adjust volume, special effects, or the like.

Musicians who distribute their music in an audio CD or the like, typically do not distribute each individual master track to consumers for various reasons. One reason is that the recipient of a digital multi-track recording typically will require the multi-track recording software application that was originally used to record or mix the tracks in order to play the recording. The recipient may also require additional information files, such as project files, to play the multi-track recording. Another reason is that original multi-track digital recordings are typically very large in size, requiring many hundreds of megabytes or even gigabytes of space per individual song. This makes it impractical to distribute many songs, each having a size of several hundreds of megabytes, to a large number of people. Thus, commercial distribution of audio recordings, particularly music recordings, continues in a pre-mixed stereo version that, albeit considerably smaller in size, lacks features for manipulating individual master tracks for custom mixing operations.

Technology regarding audio reproduction has also developed over the years. From monaural playback to stereo, Hi Fidelity, and now to surround sound formats, audio reproduction technology strives to accurately emulate the sound of original recordings.

People have come to appreciate surround sound technology while attending movie theaters equipped with multi-channel sound systems. Recently, multi-channel sound technology has become available to the home consumers in the form of DVD video, DVD audio and SACD audio. These and other known formats have enhanced audio reproduction quality over time.

FIG. 2 shows a known DVD that includes a multi-channel soundtrack commonly referred to as 5.1, AC-3 or DOLBY DIGITAL surround sound audio compression. The audio compression encodes a range of audio channels into a bit stream. As shown in the example DVD of FIG. 2, six channels are provided that include a left channel, a center channel, a right channel, a left-surround channel, a right-surround channel, and a sixth channel that provides bass information (providing frequencies of up to 150 Hz), known as a low frequency effect channel, or LFE. It is found that for frequencies below 150 Hz, i.e., bass tones, the direction of the frequencies cannot be detected by human ears.

As technology directed to enhancing the audio listening experience continues to evolve, new patterns have started to form. For example, scores of people download stereo music in MP3 form. It is believed by the inventor that people will continue to desire to interact with audio recordings over time.

SUMMARY OF THE INVENTION

It is desirable to provide recipients of audio recordings, particularly music recordings, with access to the original, individual master tracks of the recordings. It is further desirable to allow for manipulation of individual master tracks of the audio recordings, such as provided by multi-track digital recording applications, without the overhead (e.g., storage space, software applications, extraneous data files, or the like) associated with such applications.

In an example embodiment of the present invention, a multi-track audio recording is fixed in any one of the known playable media. Examples of digital playable media are CD's, DVD's, SACD's, DVD-audio discs, or the like. A DVD, for example, is formatted in a multi-channel 5.1, 6.1 and/or 7.1 surround sound format, such as DOLBY DIGITAL surround sound or DD DOLBY DIGITAL, DTS DIGITAL SOUND or DTS DIGITAL SURROUND or the like. These multi-channel formats are referred to as "surround sound" formats. In typical pre-recorded off-the-shelf playable media, such as DVD's the master tracks are not individually accessible to a user and, hence, can not be manipulated.

Preferably, in the playable media of the present invention, the multiple channels have discrete master tracks which are individually accessible to the user so that he or she can manipulate and custom mix the audio recording according to personal preferences. Surround sound formats, typically, use compression algorithms that minimize the space required for the multi-channel recordings.

In one example embodiment of the present invention, a watermark or other digital element is included to identify an originating source of the recording. Thus, in an example embodiment of the present invention, music is provided in an interactive format that currently cannot be easily downloaded, for example, from the Internet.

As noted above, for example, in a 5.1 DOLBY DIGITAL surround sound format, the six channels represent left, center, right, left rear (or side), right ear (or side), and sub-woofer (LFE) channels. In accordance with an example embodiment of the present invention, one or more channels preferably each include a single master track. For example, one channel contains a vocal track while another channel contains a piano track. With the present invention, a user can manipulate the levels of the master tracks, i.e., the channels, and create a custom mix of the audio tracks. The present invention preferably provides users with access to master tracks for custom mixing operations in a stereo or even monaural format, as well.

In accordance with another example embodiment, each of the six channels contains more than one master track. In this embodiment, a user can manipulate the channel as a whole, or each individual master track that makes up a channel.

It is noted that the term, "discrete" is commonly used to refer to a surround sound format in which all of the channels, including the rear surround channels, provide discrete content. Examples of discrete surround sound formats include DOLBY DIGITAL 5.1, DOLBY DIGITAL 6.1 EX DISCRETE and DTS-ES 6.1, as opposed to the DOLBY PRO-LOGIC surround sound format, in which the right and left rear channels do not provide discrete content. As used herein, use of the term "discrete" or any other term referred to herein should be interpreted as broadly as possible and is not meant or intended to limit the present invention in any way.

In an example embodiment, the present invention relates to a process that brings audio recordings, for example, music, to the consumer in an innovative way. The interactive playable media of the present invention is distributed, in part, so that the music consumer can enjoy the music experience in an interactive way. More particularly, the consumer preferably has access to multiple and discrete channels in which the channels and/or the master tracks can be isolated and manipulated individually.

Preferably, a playable media is provided containing music which can be played using a mixing board (such as in music clubs), a home computer, or other device, such as a home DVD, SACD or surround sound system in accordance with the present invention. In an example embodiment of the present invention, the playable media is distributed with an audio mixing software program which can be used to isolate and manipulate individual tracks and/or channels.

An example embodiment of the present invention includes an apparatus in hardware and/or software form that preferably has a plurality of faders and muting controls to enable a consumer to manipulate channel and/or track levels to produce a custom mix of the tracks in the respective channels and/or tracks (e.g., lead vocal, guitar, keyboards, etc.) or to isolate a particular instrument or vocal part (muting all the other sounds and music). In an example embodiment, the apparatus can be part of an audio receiver, home theater receiver apparatus or can be an add-on thereof to make selections on a television or other display or like device for performing functions as described herein.

The ability to isolate a particular instrument or vocal part has many benefits, e.g., so as to better study and understand the part. This is also useful for the classical music community, such that where a violin or cello part can be isolated and examined for, for example, notation, vibrato, tone and other nuances.

In an example embodiment, the content stored on a playable medium, such as audio content, is provided by an artist. This enables consumers to enjoy an educational and interactive studio-like experience. In the prior art, content is distributed in formats that do not support the functionality provided by the present invention. One of the benefits of the present invention, therefore, is to embrace the consumer with the artist's content in a more interactive way. The benefits can, of course, be extended to all kinds of music and could also have application in teaching multi-languages where necessary. Furthermore, the present invention can be extended to video and film, such that individual filming from individual camera positions can be isolated and manipulated by a user.

BRIEF DESCRIPTION OF THE DRAWINGS

For the purposes of illustrating the invention, there is shown in the drawings a form which is presently preferred, it being understood however, that the invention is not limited to the precise arrangements and instrumentalities shown. The features and advantages of the present invention will become apparent from the following description of the invention that refers to the accompanying drawings, in which.

DETAILED DESCRIPTION OF THE EMBODIMENTS

The present invention relates to manipulating audio and/or video recordings, particularly music recordings, by giving a user access to individual master tracks and/or channels that make up the recording, that he or she previously did not have access to. The master tracks and/or channels can be manipulated in a variety of ways, such as by adjusting the volume levels and adding special effects.

Figure 1:
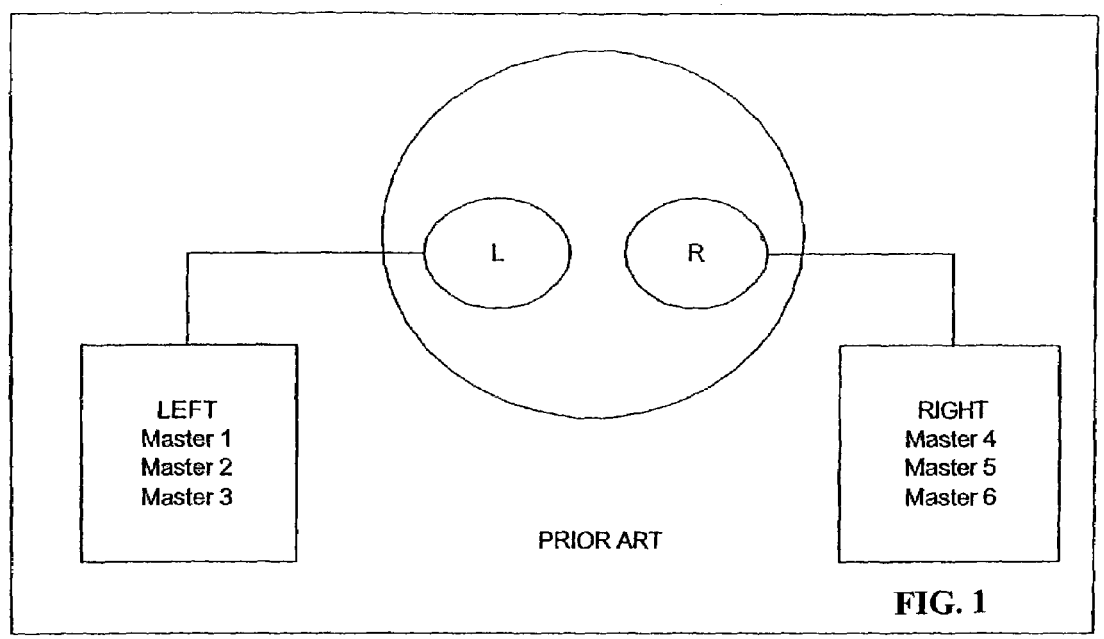
FIG. 1 shows an example prior art audio CD having right and left stereo channels.
Figure 2:
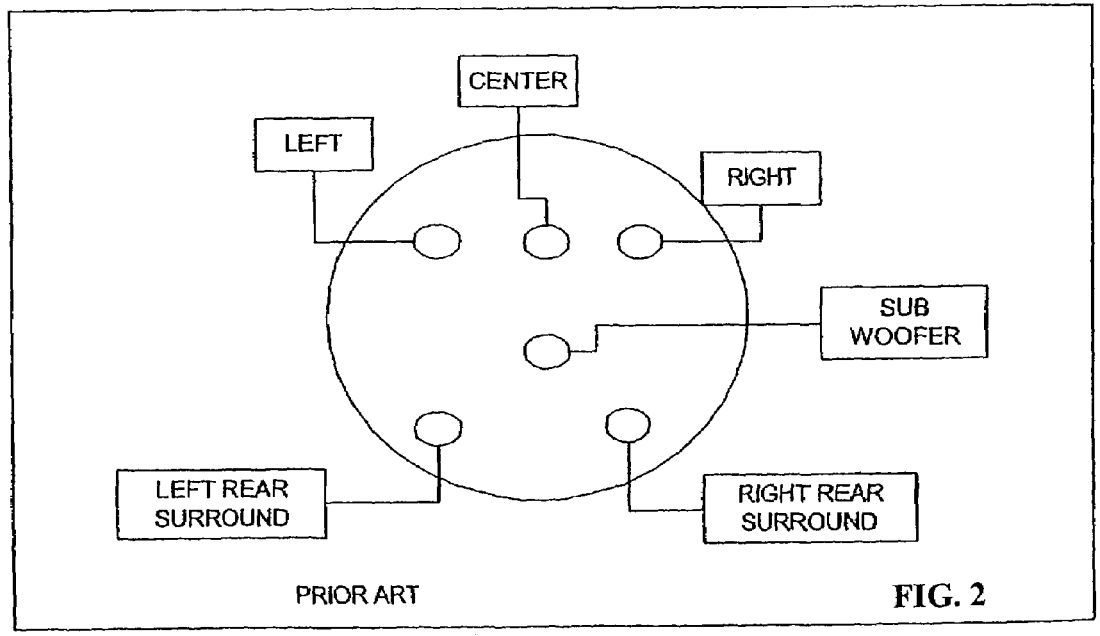
FIG. 2 shows an example prior art DVD having a DOLBY DIGITAL multi-channel soundtrack.
Figure 3A:
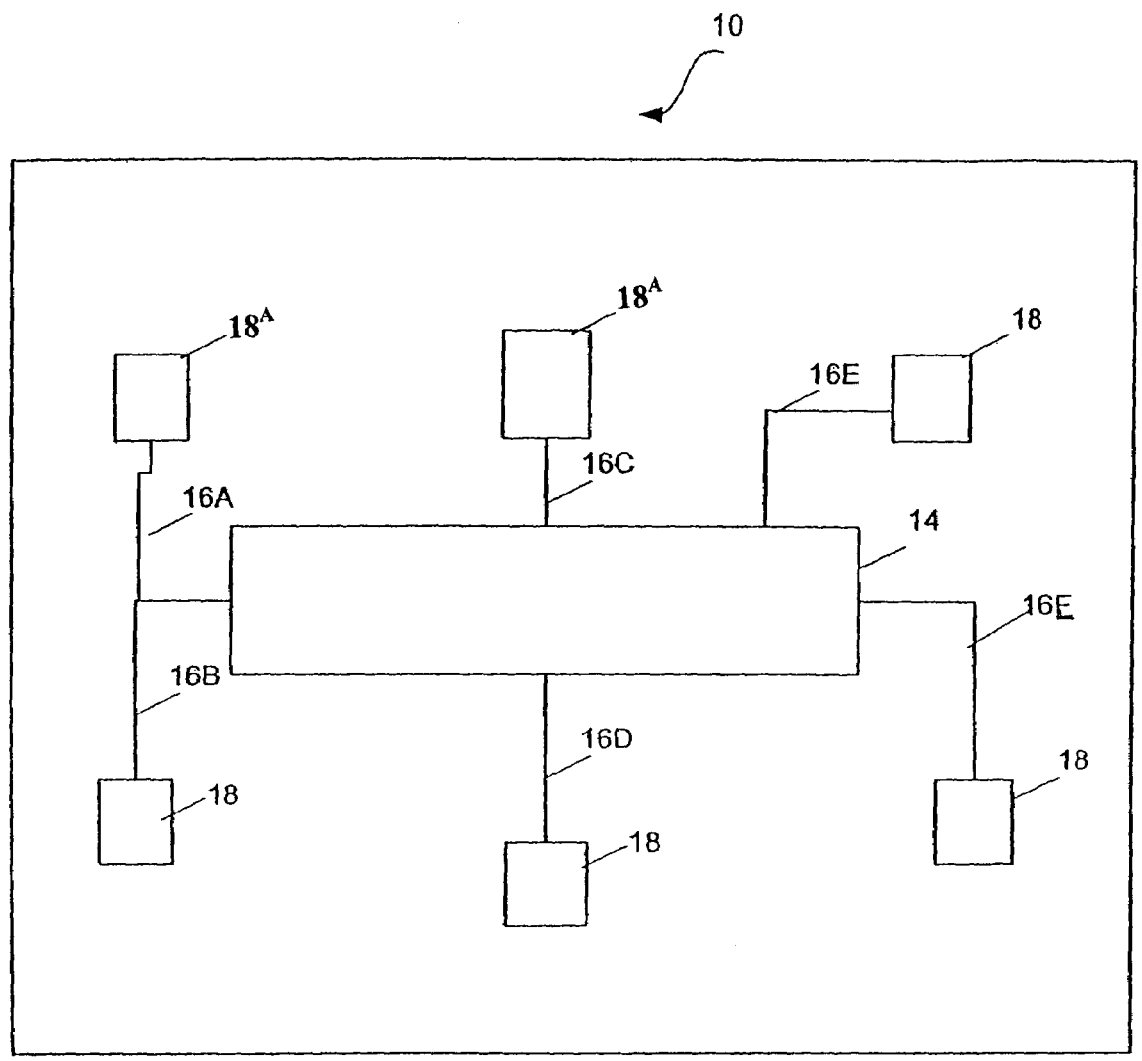
FIG. 3A shows a block diagram that represents an example interactive playable media in accordance with an example embodiment of the present invention in which each of the master tracks can be individually accessed and manipulated.
Figure 3B:
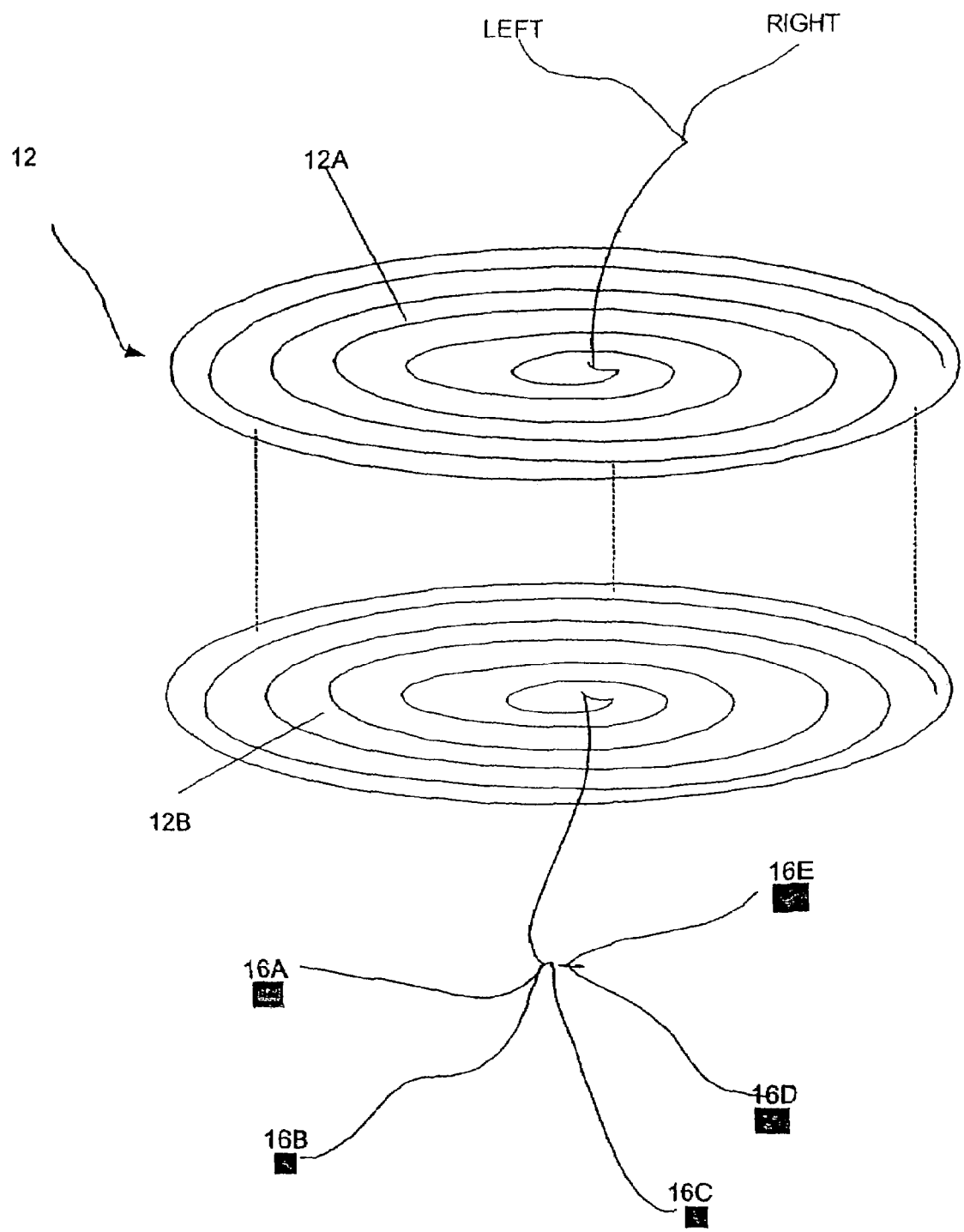
FIG. 3B shows an exploded view of an interactive playable media disc in accordance with an example embodiment of the present invention.

Referring now to the drawings, wherein like numerals refer to like elements, FIGS. 3A and 3B show a block diagram representing an example embodiment of the present invention that includes an interactive playable media, preferably formatted as a disc, such as a CD or DVD, that forms part of an audio interactive system 10. The playable media 12 is recorded in such a way as to allow a user to have access to, and manipulate, individual master tracks and/or channels. The audio interactive system 10 includes means, more fully described below, that allows one or more of the channels and/or master tracks of the playable media 12 to be individually accessed and manipulated.

It should be realized by those skilled in the art that the invention is not limited to any particular format, but is adaptable to be used in connection with any tangible form of playable media with digital or any other form of data stored thereon, including but not limited to CD, DVD, super audio CD ("SACD") and/or DVD-audio formats or like formats (collectively "playable media").

In particular, the playable media 12 is in the form of any of the known audio discs, e.g., CD, and includes discrete audio tracks that are played on one or more respective channels via player 14 (FIG. 4) of the present invention. This enables a listener to manipulate the individual, such as a consumer, tracks of recorded audio via five channels 16A-16E, for example, in a surround sound system, FIG. 3B.

To exploit the musical potential of the present invention, at least five speakers $18$-$18^4$, corresponding to the five channels 16A-16E can be used, FIG. 3B. It should be realized by those skilled in the art however, that fewer than five speakers, such as a two-speaker system (or even a single speaker) can be used to isolate and/or manipulate discrete channel operations in accordance with the present invention. For example, solo guitar, vocals, or the like can be isolated by muting all of the channels playing the other tracks containing recorded parts. Solo guitar, vocals or the like can also be isolated by muting relevant individual master tracks. The present invention preferably provides an individual, particularly a consumer's own mix, for example, to be used as a learning or teaching tool.

Additionally, the present invention can be manipulated by a user, particularly a consumer, to add one or more audio tracks to an existing recording. For example, a user can manipulate the present invention to isolate and remove an individual track, such as a vocal track, and then to record his or her own vocal track while the remaining tracks are playing. The user can then use the present invention to simultaneously listen to the original recording with his or her own recorded track.

Thus, the present invention provides a new way for multi-media contents to be provided to a consumer. Unlike prior art multi-media distribution, the present invention enables custom master track and channel manipulation by consumer users. As used herein, the term, consumer, generally refers to a person who purchases for his or her own personal use. For example, a consumer purchases from a retail environment. Consumers, typically, do not purchase, for example, audio content in order to commercially resell or distributes to others.

As used herein, the term "consumer playable media," refers, generally, to playable media distributed to consumers. Further, as used herein, users of the present invention are consumer users.

In an example embodiment, the playable media of the present invention can also be used to play recorded music in stereo, such as provided in prior art CD-audio discs.

Continuing with reference to FIG. 3B, an exploded view of an example embodiment interactive audio disc 12 is shown. In this example embodiment, audio disc 12 preferably has two layers, 12A and 12B. Each layer preferably includes a respective data stream, represented as a round spiral line in each layer. Top layer 12A provides information for playing the audio recording in two channels, namely left and right. Lower layer 12B provides information for playing the audio recording in respective channels 16A-16E. Thus, with the playable media of the present invention, the consumer gets the two channel stereo version as originally distributed. With the added second layer 12B, he/she gets the option to create a personal interpretation of how the music feels to that person. Of course, in an example embodiment, audio disc 12 can include only the lower layer 12B.

Top layer 12A in playable media 12 is the audio provided in a stereo format, as typically distributed in the prior art. Lower layer 12B is a multi-channel layer that includes five distinct audio tracks that are preferably encoded to play on channels 16A-16E, although the lower layer need not be limited to five channels. In an example embodiment, one channel 16A contains a keyboard track, two channels 16B, 16C includes vocal tracks (which may be the same vocal track or two different vocal tracks), one channel 16D includes a drum track and one channel 16E includes a guitar track. With the present invention, each discrete track can be isolated and played over its respective channel (16A-16E). For example, by manipulating the volume levels of channels 16B-16E, a user can cause the only audible channel originating from a single speaker 18 in the surround sound system to be the keyboard track channel 16A.

In another example embodiment, the lower layer 12B can be a custom mix. Thus, with the present invention, the user would have the option to choose either the prior art stereophonic mix from the top layer 12A or a pre-loaded custom mix from the lower layer 12b made possible by the functionality provided by the present invention. For example, after an interactive playable media is inserted in a playing device, mixing software would prompt the user to select a button or other graphic or physical control to select stereo playback or the custom mix. Various techniques for prompting users to select audio settings are known in the art, such as provided by DVD players and other universal players. The selection for a custom mix that is received from the user instructs the playing device to read the proper layer.

In an example embodiment, the two-layer disc can be provided in the MICROSOFT WINDOWS MEDIA PRO format. This format provides for excellent compression techniques and, further, can be used to provide Digital Rights Management ("DRM"), as discussed below.

As noted above, each of two channels reserved for vocal tracks (16B and 16C) may contain the same vocal track. A benefit of playing a single vocal track (e.g., lead vocal) on more than one channel is the degree of manipulation that is available to the user. For example, the volume level of each discrete audio channel 16B and 16C can be individually manipulated by the listener. Thus, audio disc 12 of the present invention which has the same vocal track on two discrete channels (16B and 16C) can be manipulated such that the listener can pan the vocal track from a left rear speaker to a right front speaker. By including the vocal track on two discrete surround sound channels, the listener can create an effect in which the vocal track appears to move from one part of a room to another. This effect is desirable, for example, in a music club setting.

In an example embodiment of the present invention, the individual tracks can be isolated and manipulated as well. For example, channel 16A can contain a keyboard track and one or more vocal and/or instrumental tracks. Thus, not only can channel 16A be isolated and manipulated as a whole, but each underlying track can also be individually isolated and individually manipulated.

Moreover, each individual track can be isolated and manipulated in many different ways. For example, changes in audio frequencies of an individual master track can be custom manipulated by a user. Thus, the present invention can manipulate a single guitar track to play with various frequencies or with special effects, irrespective of the particular channel the guitar track plays on. Moreover, the present invention also supports custom manipulation of individual channels. For example, a single channel can be manipulated to play with various frequencies or special effects. In this way, the present invention affords greater flexibility over prior art systems.

In an example embodiment, digital audio files in a surround sound format (e.g., DOLBY DIGITAL surround sound) are preferably encoded such that a plurality of channels are coded as a single entity, and in which a digital data stream is compressed and decoded to provide a representation of the sound in the original format (e.g., WAV format) with little sound degradation. In accordance with an example embodiment of the present invention, the decoded surround sound files are decoded and formatted as WAV files. The files are then manipulable in a digital audio mixing software application, such as may be provided in the prior art. In other words, in accordance with an example embodiment of the present invention, the audio file(s) stored on disc 12 are preferably in a surround sound format, thereby requiring a decoder (such as a DOLBY DIGITAL decoder), to decode the data stream and provide files, for example, formatted as WAV files in order to enjoy the benefits of the present invention. In one example embodiment of the present invention, the user of the present invention may save the WAV files to another source. In another embodiment, and as described in detail below, the user may not save the WAV files.

In an alternative embodiment of the present invention, a combination of files in various formats, for example, WAV files and DOLBY DIGITAL surround sound files, are provided in disc 12 for additional flexibility. By providing a combination of WAV files and DOLBY DIGITAL surround sound files, it is possible to replace the recorded tracks on the right and left channel of top layer 12A with dynamically selected WAV files. In this way, a listener has increased flexibility with respect to the audio content that is provided by the present invention.

In an example embodiment, audio interactive system 10 includes any apparatus in hardware or software form that is capable of manipulating and/or isolating one or more of the individual tracks and/or channels of a playable media as described herein. In an example embodiment, such an integral apparatus can be any of the known audio mixing software programs and/or variations thereof, including but not limited to applicant's UMIXIT software.

The audio interactive system 10 may be included in hardware or software form as part of a conventional playable media playback apparatus such as a home stereo or home theater receiver, DVD player, CD player, DVD-audio player, SACD player, a car stereo system, a computer with specific sound programs for example providing music faders and separation, or the like. In an example embodiment, audio interactive system 10 can be a separate component, in hardware or software form designed to be used in connection with a home stereo or home theater receiver, DVD player, CD player, DVD-audio player, SACD player, computer or the like.

In an example embodiment, the audio disc 12 is designed to be backwards compatible with conventional playable media playback apparatus. In this way, a listener operating a home stereo system that is not equipped for surround sound output or multi-track mixing can use custom interactive audio disc 12 as a conventional audio CD, DVD or the like, Thus, custom interactive audio disc 12 preferably functions in the technological environment in which it is placed.

Figure 4:
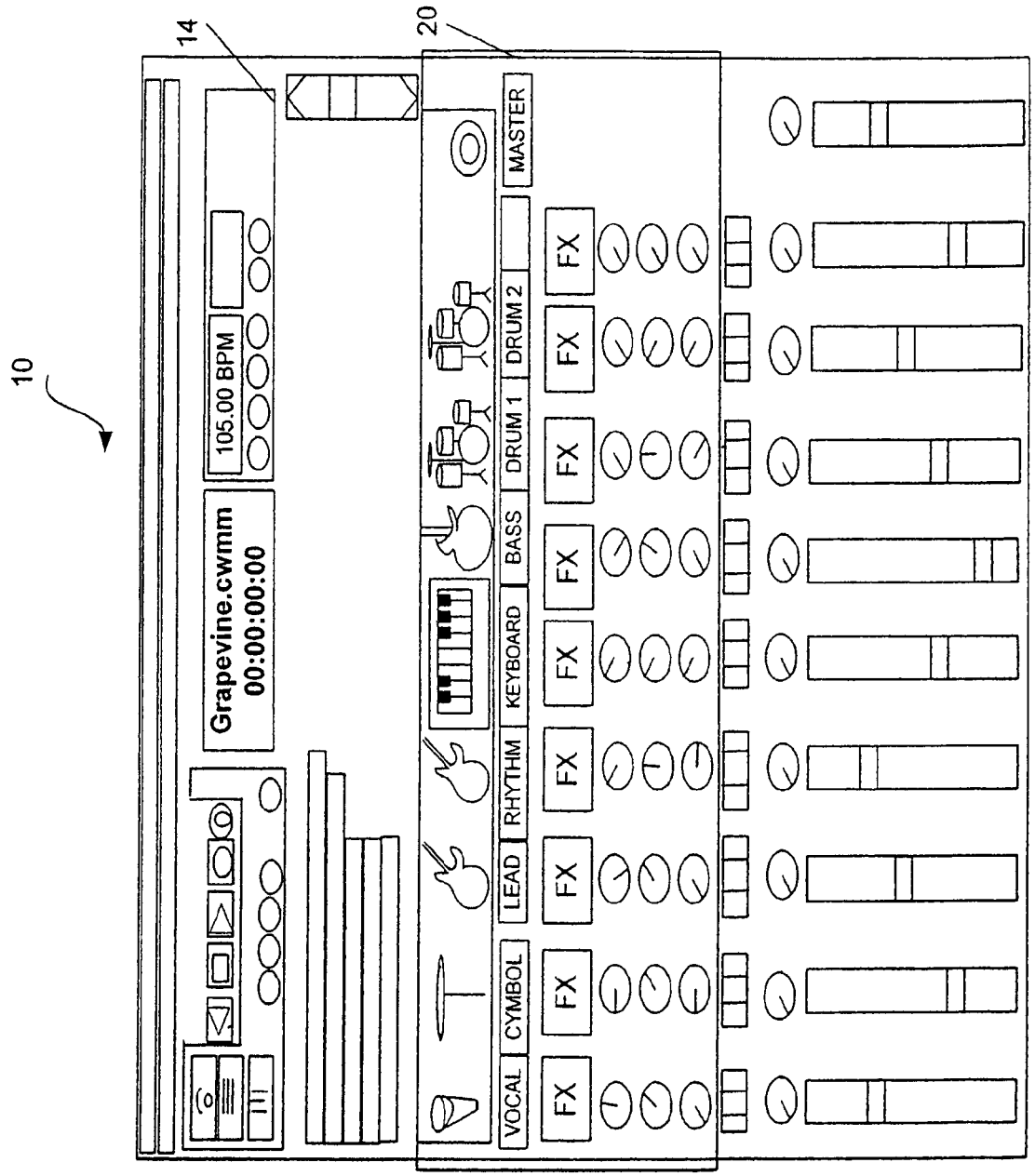
FIG. 4 shows an example device that plays audio recordings in accordance with an example embodiment of the present invention.

FIG. 4 shows an example device 14 that forms part of interactive system 10 to manipulate an audio recording in accordance with the present invention. In an example embodiment, device 14 is an audio mixing software program that is capable of manipulating and/or isolating discrete audio tracks and/or channels 16A-16E of audio disc 12 (in the example shown in FIG. 3B). Preferably, example device 14 is displayed on any of the known display devices such as a television, monitor, computer monitor or the like. As noted above, audio disc 12 preferably can be used in a stereo system consisting of two channels (or even a single, monaural channel) without necessarily sacrificing the ability for the user to manipulate the levels of isolated tracks.

Preferably, example device 14 can manipulate the individual channels 16A-16E (FIG. 3B) and/or tracks in one or more ways. In the example shown in FIG. 4, level controls 20 are provided in the form of circular knobs for a convenient way to control many different functions, effects and/or levels such as volume levels, frequency levels, compression levels, limiter audio effects, expansion audio effects, De-Essor audio effects, visual sequencing effects, noise reduction audio effects, distortion audio effects, random vocal audio effects, looping audio effects, etc. Such audio effects are well known to those skilled in the art. Of course, any of the known control formats can be provided, e.g., slider controls.

Figure 5:
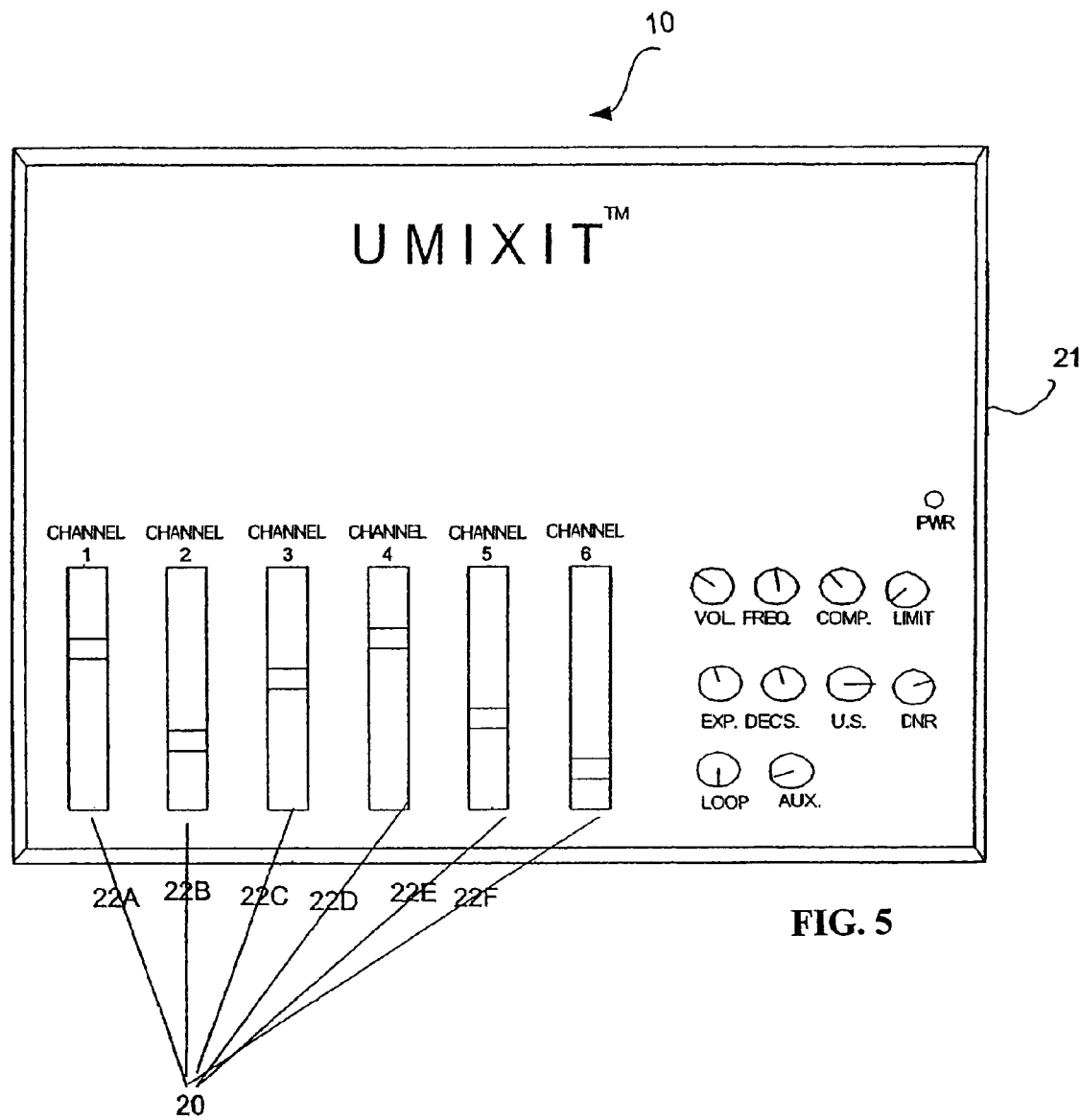
FIG. 5 shows another example device to play audio recordings in accordance with an example embodiment of the present invention.

FIG. 5 shows an alternate example of a device 21 that can manipulate a playable media having individual channels 22a-f. Moreover, like example device 14, one or more of the channels can be customized by manipulating the aforementioned functions, effects and/or levels.

Preferably, each control 20 in FIG. 4 and controls 22a-f in FIG. 5 is preset according to information encoded in audio disc 12. When a user of the present invention places disc 12 into a playing device, for example, and a song is about to begin playing, the controls are positioned to default settings. Preferably, the settings represent the mix (e.g., panning of each track, volume levels or the like) desired by the artist, producer and/or distributor.

The user can then adjust the controls 20, 22a-f to manipulate the levels and effects of each channel and/or track to create a custom mix. In an example embodiment, the user has the option to save the custom mix by, for example, saving the newly mixed version to a fixed disc, magnetic tape, or other suitable medium. Such as a CD, DVD or the like.

In an example embodiment, as more fully explained below, Digital Rights Management technology ("DRM") is employed to prevent a user from saving a newly mixed version to a fixed disk, magnetic media, or other suitable medium capable of storing the newly mixed version.

In an example embodiment of the present invention, after a recording that has been modified in accordance with the present invention ends and a new or different recording is to begin, the controls are preferably automatically set to their default positions.

Figure 6:
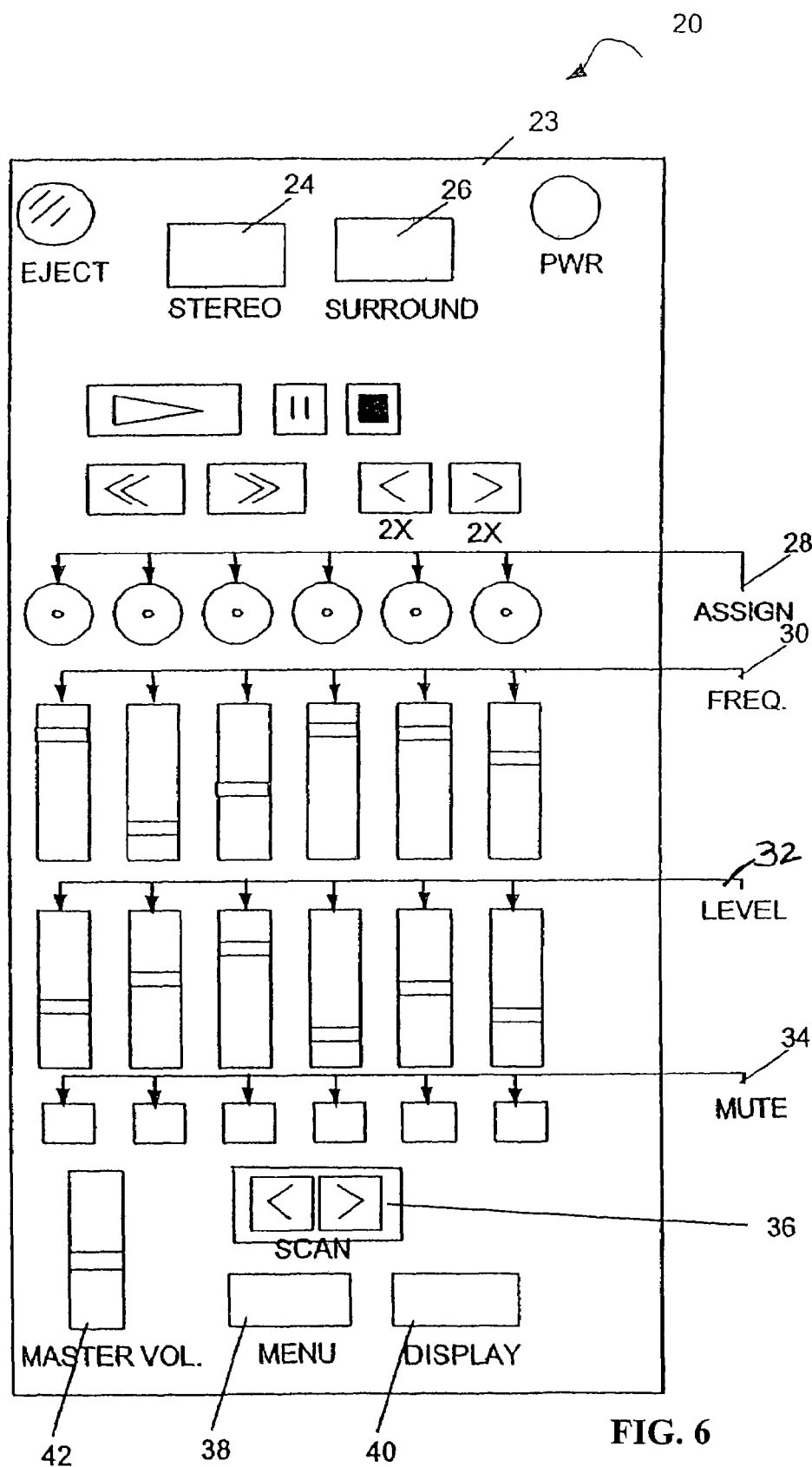
FIG. 6 shows a remote control device to be used in accordance with an example embodiment of the present invention.

In an example embodiment, the audio interactive system 10 can be used in connection with a remote control device to allow for remote manipulation of the channels and/or master tracks of the disc 12. FIG. 6 shows an example remote control device 23 that can be used in connection with example device 14. Preferably, controls 20 include particular controls to control functions from example device 14. For example, controls 24, 26 enable the listener to switch between stereo and surround sound formats, respectively. Controls 28 enable the user to select and manipulate one or more tracks to play on one or more respective channels. Controls 30 enable the user to manipulate the frequency levels of tracks assigned to a particular channel. Controls 32 are used to increase or decrease the level of one or more channels. Controls 34 include mute buttons to enable a user to mute one or more assigned channels.

Controls 36 enable a user to scan within one or more tracks in order to identify a specific portion of a recording. Controls 38 include a menu button that provides a choice for a plurality of menu items, for example, display options, audio output options and the like. A display button 40 provides access to display features of the present invention, including, for example, titles, images and the like. Master volume control 42 enables a person to increase or decrease the volume of all channels assigned by assign button.

Preferably, all of the functionality shown in FIG. 6 on remote control device 24 should be directly accessible on example device 14, or the device upon which remote control device 24 controls. It should be realized by those skilled in the art, however, that the remote control device 23 can include functionality not directly accessible on example device 14.

Figure 7:
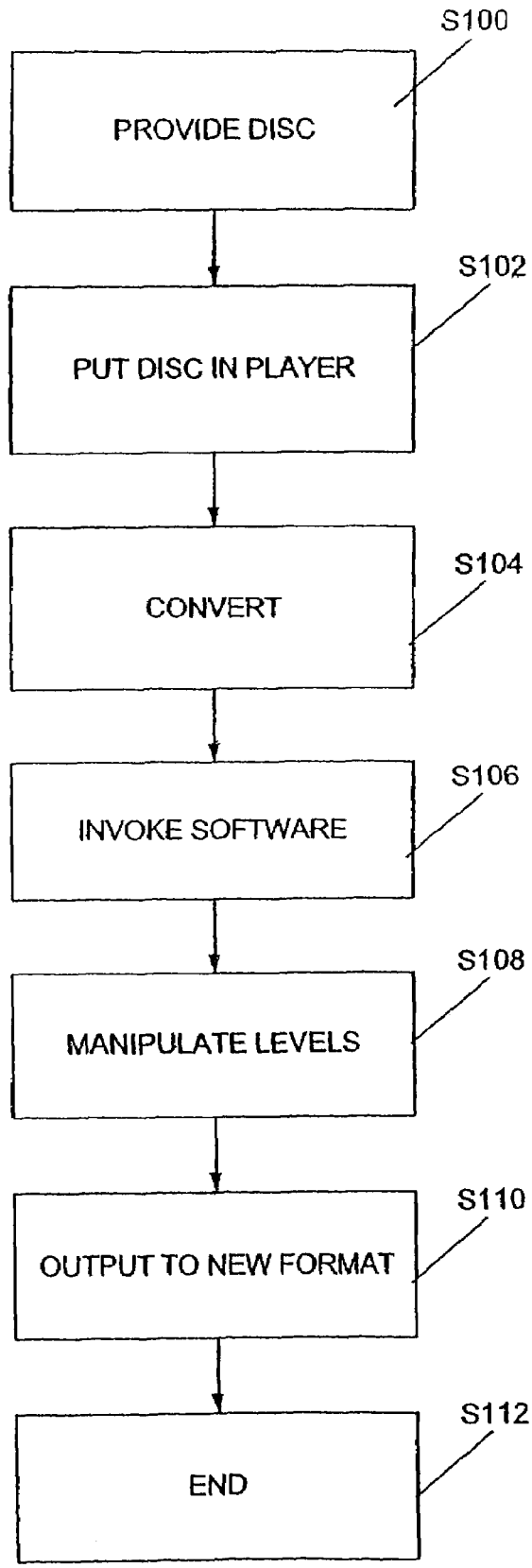
FIG. 7 shows a flowchart that represents steps associated with manipulating individual channels in accordance with an example embodiment of the present invention.

FIG. 7 shows a flowchart that represents steps associated with manipulating individual channels in accordance with an example embodiment of the present invention. In step S100, a playable media such as disc containing a song having eight tracks, in which each track consists of a single instrument or voice, is provided in a multi-channel, 7.1 surround sound format, for example, having eight tracks. The disc is then placed in a player, and the data is decoded for future manipulation by an operator of the present invention (step S102). Thereafter, in step S104, the audio files are transformed into a format, such as WAV, compatible with a digital audio mixing software or hardware in accordance with the present invention. This application is built into the player or can be in the form of a plug-in to be used with the player. The transformation preferably occurs in a memory, such that the disc is not modified and that the contents remain the same in the future when steps S100-S104 are repeated.

Continuing with the flow chart shown in FIG. 7, the audio mixing application is operated to access (or "load") the WAV files in the memory (step S106). When the WAV files are loaded according to predefined ("default") settings (e.g., volume levels) into the application, during playback of the WAV files the operator has the ability to manipulate the levels according to his or her preferences (step S108). For example, all of the volume levels for channels 1-7 can be set to zero, effectively muting those channels from playing. In this example, only channel 8, which may represent a keyboard recording or recordings, is played via audio interactive system 10. In step S110, the operator can save a revised version of the mixed audio channels (e.g., channels 1-7 muted) to a separate source, such as a recordable compact disc (e.g., "CD-R"). Thereafter, in step S112, the process ends and the next time the process repeats with step S100, the surround sound file is decoded and the WAV files are loaded in accordance with the default settings. In this way, surround sound files having separate channels of distinct audio recordings can be manipulated according to an operator's preferences and, thereafter, stored in a different format (e.g., CD-R) for future enjoyment, while leaving undisturbed the original surround sound file.

The features of the present invention are now further explained by way of example.

In an example embodiment of the present invention, a disc jockey in a music club can use the audio interactive system 10 in conjunction with a 7.1 surround sound system. The disc jockey could use a custom interactive audio disc of the present invention having eight discrete channels of music with each channel having more than one track. Each channel would preferably support individual level controls and effects. Each track would also preferably support individual level controls and effects to allow for finer manipulation. The disc jockey could then operate the system to manipulate the channels contained in the disc, or manipulate individual tracks. For example, the disc jockey could assign one or more tracks to one or more channels, and/or isolate an individual track or tracks and play the track(s) through various speakers located around the room in any order he chooses.

Continuing with the present example, during the playback of a song, the disc jockey could increase or decrease the levels of the respective isolated channels and/or tracks at his convenience, thereby providing a musical effect having accents and characteristics that were previously unavailable in the prior art.

In an example embodiment of the present invention, technology is included to protect the rights of the copyright holder in the copyrighted audio recordings. Audio recordings, e.g., CD's, are typically distributed in a stereo format in which the master tracks are not available for isolation and re-mixing. In accordance with the present invention, the CD would include an additional mixable format wherein the individual master tracks can be isolated and manipulated. As noted above, this dual format is preferable so that prior art stereophonic audio playing devices can play the audio recording in its original state. The inventor of the present invention recognizes that artists and/or owners of copyrights in audio recordings may not wish to have re-mixed versions of their copyrighted material distributed by unauthorized users of the present invention.

Thus, to protect the rights of copyright holders, Digital Rights Management ("DRM") technology is preferably included to prevent copies of an audio recording from being distributed by users of the present invention. In an example embodiment, when a user places audio disc 12 in a player in accordance with the present invention, an identification of the device, such as by the Media Access Control ("MAC") address of the processor, is received and assigned a license number. As those skilled in the art will recognize, MAC addresses and corresponding license numbers may be stored in one or more databases stored locally and/or remotely and used to enforce licensing terms. For example, in the event that the user tries to place audio disc 12 in a different device (i.e., having a different MAC address), the present invention preferably includes technology that prevents the audio device from accessing the audio recording, or at least that portion of the recording that allows the tracks to be manipulated. Of course, one skilled in the art will recognize that all of the known DRM technology or the like is envisioned herein and within the scope of the present invention.

In an example embodiment of the present invention, the DRM technology does not apply to devices that access the top layer 12A of audio disc 12 which includes the typical stereo playback format having channels and/or tracks that can not be isolated and manipulated in accordance with the present invention. For example, DRM technology would not apply to a user who places audio disc 12 in a prior art stereo CD audio player. Accordingly, the stereo playback format of the audio recording on audio disc 12 can be played on a plurality of prior art compact disc players without interference from digital rights management technology.

Alternatively, if a user tries to access the multi-track lower layer 12B of audio disc 12 to manipulate individual tracks in a multi-track recording, for example, the DRM technology would be invoked. A reference could be made to determine whether the user is attempting to access the individual tracks on a device that is not registered as supported in accordance with a valid license. In this way, a user can manipulate individual tracks to produce a custom mix of an audio recording, possibly including newly added tracks by the user, but cannot distribute the recording to others. Thus, this feature protects copyright owners from unauthorized distribution of derivative works or other copyright infringements.

The present invention provides other security features. In an example embodiment, the present invention can provide audio recordings with a "watermark," for example, to trace the originating location (e.g., IP address) of any download. This can be implemented by any of the known methods. Further, audio recordings provided with the present invention have a "built-in" security feature to prevent downloading. This is because the audio recordings are impractical to download due to their large size. It would take several to many hours to download, even with a high-speed connection, in order to receive 74 minutes of music spread over six tracks. Thus, this would have the effect of deterring would be copyists. Moreover, as understood by one skilled in the art, the present invention provides additional security by encoding audio tracks to play in a surround sound format, e.g., DOLBY DIGITAL. Audio tracks formatted to play in a surround sound format, typically, cannot play in a prior art stereo player, such as a CD player or the like.

Other features of the present invention are now described. As noted above, various audio effects, such as compression, chorus, flanger, wah or the like can be added to one or more tracks to customize and manipulate the recording on audio disc 12. In an example embodiment of the present invention, a graphic control, such as a drop-down list, is provided that identifies various audio effects that are available for the user. Further, one audio effect can be applied to a plurality of tracks, or alternatively, each audio track can be manipulated by a respective audio effect. For example, a chorus effect can be applied to a guitar track, while a reverb effect can be applied to a vocal track.

It should be realized by those skilled in the art that the present invention need not be limited to audio application. For example, disc 12 can include video recordings in addition to, or in combination with audio recordings. For example, individual camera positions can be stored in a playable media and made available to a user to isolate one or more camera positions and manipulate the images therein. Furthermore, a user can use the present invention to add additional video footage to an existing video recording. In this way, a user can interact with video recordings as well as audio recordings in accordance with the present invention.

Moreover, in an example embodiment of the present invention, one or more sample "loops" are provided that enable a user to interact with the audio provided on audio disc 12. For example, a sample loop of a drum beat is stored on audio disc 12 and made available to a user via a graphic screen control, such as a drop down list. Thereafter, the user defines the length of time for the drum loop to play during playback of the audio recording. For example, the user defines the drum loop to play during the first thirty seconds of the audio recording. Using this example embodiment of the present invention, the drum loop plays during the first thirty seconds while the audio recording plays. Of course, one skilled in the art will recognize that many sample loops, such as those commonly provided in prior art audio mixing software, can be integrated in the present invention to enable a user to interact with the audio provided on audio disc 12 in dynamic ways. For example, drums, guitars, keyboards, bass lines or the like can be integrated with an audio recording.

The benefits of the present invention are numerous. For example, DJs can use a universal system that easily plugs into their existing mixing club deck. Schools as well as individual users can use the present invention to enhance learning, creativity and enjoyment. And users will find embodiments of the present invention to be exciting, new, and a fresh approach to playing and listening to music.

The interactive playable media of the present invention is preferably distributed with various marketing materials. For example, the playable media is placed in a computer and a hyperlink to an Internet Web site representing the artist is provided to the user. When the hyperlink is selected, the Web site is displayed, for example, in an Internet Browser, such as MICROSOFT INTERNET EXPLORER or NETSCAPE NAVIGATOR. Of course, one skilled in the art will recognize that many hyperlinks to various Web sites can be included with the present invention to provide marketing for the artist or other entity. Further, other forms of marketing materials can be provided with the present invention, for example, graphic art work, published materials or the like.

The present application has broad applications. As teenagers use more and more "samples" of the present invention, the use of the invention will grow. Some will like the idea of learning musical parts in the song or composition. Others will like experimenting with different mixes, e.g., removing vocal tracks, highlighting guitar, bass or drums tracks, or the like. The present invention provides an exciting, new dimension to the music that consumers thought they already knew.

In an example embodiment, the interactive playable media is applied, for example, to the SONY PLAYSTATION or other gaming device, and provides controls for isolating discreet audio channels and multi-channel mixing. Moreover, an option for displaying music videos on a display screen while a user manipulates sonic values of respective audio tracks is available.

In another example embodiment, the interactive playable media can be used as a Karaoke device. In such a device, lyrics of a song that is being played may be accompanied by additional information on the screen, such as sonic track information. In this application, one or more channels of a song are played while the user supplements the song with, for example, vocals.

More particularly, in an example embodiment of the present invention, lyrics to a song recorded on the playable media of the present invention are presented on a display screen while the song is being played. A user can add a microphone to a playing device, such as by plugging a microphone into a computer's sound card, and can sing along with the song. Preferably, the present invention highlights the lyrics that correspond with the part of the song that is being played. For example, as the singer sings the words "I heard it through the grapevine," the lyrics to the entire song I Heard It Through the Grapevine are provided in a display, with the words "I heard it through the grapevine" highlighted. When the singer sings the next line of the song, "I was just about to lose my mind," the present invention removes the highlighting from the words "I heard it from the grapevine" and applies highlighting to the words "I was just about to lose my mind." In this way, the present invention operates as a Karaoke. As noted above, the user can use the present invention to record another track and include it with the tracks that were distributed with the playable media. Alternatively, the user can use the present invention as a Karaoke device and simply sing along with songs with the respective words highlighted as the song plays.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A method for distributing audio content having a plurality of audio tracks, the method comprising:
   mixing the audio tracks in the audio content to provide a commercial predefined mix, wherein the audio content is readied for commercial distribution as a function of the commercial predefined mix;
   providing the audio content in the commercial predefined mix on consumer playable media;
   providing a user interface on the consumer playable media, wherein the interface includes graphical screen controls for a user to manipulate at least one of the plurality of audio tracks;
   automatically adjusting the graphical screen controls to represent the commercial predefined mix;
   providing instructions on the consumer playable media enabling the commercial predefined mix to be altered in response to the user operating the graphical screen controls; and
   providing the audio content in a first format and in a second format, wherein the user cannot alter the commercial predefined mix in the first format and the user can alter the commercial predefined mix in the second format.

2. A system for distributing audio content having a plurality of audio tracks, the system comprising:
   consumer playable media comprising audio content provided in a commercial predefined mix, wherein the audio content has been readied for commercial distribution as a function of the commercial predefined mix;
   a user interface provided on the consumer playable media, wherein the interface includes graphical screen controls for a user to manipulate at least one of the plurality of audio tracks and further wherein the graphical screen controls are automatically adjusted to represent the commercial predefined mix; and
   instructions on the consumer playable media enabling the commercial predefined mix to be altered in response to the user operating the graphical screen controls, wherein the consumer playable media further comprises the audio content in a first format and in a second format, wherein the user cannot alter the commercial predefined mix in the first format and the user can alter the commercial predefined mix in the second format.

3. The method of claim 1, wherein the user is able to manipulate at least one selected from the group consisting of:
   muting at least one of a plurality of audio channels;
   adjusting a volume level of at least one of the plurality of audio channels;
   panning between at least two of the plurality of audio channels;
   controlling frequencies of at least one of the plurality of audio channels; and
   providing at least one audio effect for at least one of the plurality of audio channels.

4. The method of claim 3, wherein the audio effect is at least one selected from the group consisting of: compression, limiter, expansion, De-Essor, digital delay, flanger, phaser, and equalizer.

5. The method of claim 1, wherein the user is able to manipulate at least one selected from the group consisting of:
- adjusting noise reduction audio effects;
- adjusting distortion audio effects;
- adjusting random vocal audio effects; and
- adjusting looping audio effects, wherein the looping audio effects include at least one of a chord progression, a percussion progression, and a bass progression.

6. The method of claim 1, further comprising providing a remote control device to control at least one selected from the group consisting of: audio and video manipulation.

7. The method of claim 1, wherein the user interface includes a software application to control at least one selected from the group consisting of: audio and video manipulation.

8. The system of claim 2, wherein the user interface further enables a user to perform at least one selected from the group consisting of:
- switching between stereo output and surround sound output;
- muting at least one channel;
- adjusting a volume level of at least one of the audio channels;
- panning between at least two of the audio channels;
- controlling frequencies of each of at least one of the audio channels; and
- providing at least one audio effect for at least one of the audio channels.

9. The method of claim 1, wherein the step of providing a user interface further comprises the step of manipulating at least one audio channel.

10. The method of claim 1, further comprising:
- compressing the plurality of audio tracks in a first format; and
- prior to providing the audio output, decompressing the plurality of audio tracks to a second format.

11. The method of claim 1, further comprising encoding the plurality of audio tracks using Digital Rights Management.

12. The method of claim 1, further comprising identifying a single device for playing the plurality of audio tracks, and preventing the at least two audio tracks from playing on any other device.

13. The system of claim 2, wherein at least one of at least three channels includes at least two tracks, and wherein the user interface enables a user to manipulate the at least two tracks.

14. The method of claim 1, wherein the step of manipulating comprises the step of manipulating at least one of a plurality of channels.

15. The method of claim 1, wherein the step of manipulating comprises at least one step selected from the group consisting of:
- switching between stereo output and surround sound output;
- muting at least one channel;
- adjusting a volume level of at least one of the audio channels;
- panning between at least two of the audio channels;
- controlling frequencies of each of at least one of the audio channels; and
- providing at least one audio effect for at least one of the audio channels.

16. The method of claim 1, wherein the step of manipulating includes a user interface embodied in at least one of selected from the group consisting of: a remote control device and a software application.

17. The method of claim 1, wherein the user interface has controls for providing at least one selected from the group consisting of: a compression audio effect, a limiter audio effect, an expansion audio effect, a De-Essor audio effect, a digital delay audio effect, a flanger audio effect, a phaser audio effect, an equalizer audio effect, and a visual sequencing effect.

18. The method of claim 1, wherein the user interface has controls for providing at least one selected from the group consisting of: noise reduction audio effects, distortion audio effects, random vocal audio effects, and looping audio effects, wherein the looping audio effects include at least one selected from the group consisting of: a chord progression, a percussion progression, and a bass progression.

19. The method of claim 1, wherein the user interface has controls for manipulating at least one selected from the group consisting of: audio and video.

20. The system of claim 2, wherein an audio output device is adapted to play the consumer playable media and at least two of the plurality of audio tracks over one audio channel, and wherein the user interface is adapted to manipulate each of the at least two audio tracks over the audio channel.

21. The system of claim 2, wherein the user interface displays lyrics of a song while the audio content is playing.

22. The system of claim 21, wherein the user interface displays a first portion of the lyrics in a first mode, and a second portion of the lyrics in a second mode, and further wherein the second mode represents a cue for a user to sing along with the audio content.

23. The system of claim 2, wherein the user interface is adapted to enable a user to add at least one other audio track while the audio recording is playing.

24. The system of claim 2, wherein the consumer playable medium is encoded with a security feature to prevent unauthorized copying.

25. The system of claim 2, wherein the consumer playable medium is encoded with a digital element to identity an originating source of the audio content.

26. The method of claim 1, further comprising providing the consumer playable media comprising the content, the user interface and the electronic instructions for commercial distribution in a retail environment.

27. The method of claim 1, further comprising saving an altered commercial predefined mix after the user operates the graphical screen controls.

28. The system of claim 2, further comprising storage for saving an altered commercial predefined mix after the user operates the graphical screen controls.

* * * * *